United States Patent [19]
Pettey

[11] Patent Number: 5,669,491
[45] Date of Patent: Sep. 23, 1997

[54] COMPACT DISC FOLDER BOOKLET

[75] Inventor: Thomas J. Pettey, Wayne, Ill.

[73] Assignee: Glenbard Graphics, Carol Stream, Ill.

[21] Appl. No.: 753,221

[22] Filed: Nov. 21, 1996

[51] Int. Cl.⁶ .................................................. B65D 85/57
[52] U.S. Cl. ..................... 206/232; 206/308.1; 206/308.3
[58] Field of Search ............................... 206/307, 307.1, 206/308.1, 308.3, 232, 309, 311, 312, 313, 387.13

[56] References Cited

U.S. PATENT DOCUMENTS

| | | |
|---|---|---|
| D. 369,106 | 4/1996 | Baker et al. . |
| 470,861 | 3/1892 | Chichester . |
| 2,435,856 | 2/1948 | Weingart . |
| 3,372,858 | 3/1968 | Brody . |
| 3,592,381 | 7/1971 | Brody . |
| 4,488,737 | 12/1984 | Jacobs et al. . |
| 4,588,321 | 5/1986 | Egly . |
| 4,640,413 | 2/1987 | Kaplan et al. . |
| 4,709,812 | 12/1987 | Kosterka . |
| 4,793,477 | 12/1988 | Manning et al. . |
| 4,832,191 | 5/1989 | Gerver et al. ............................. 206/232 |
| 4,850,731 | 7/1989 | Youngs . |
| 4,905,831 | 3/1990 | Bagdis et al. . |
| 5,085,318 | 2/1992 | Leverick . |
| 5,101,973 | 4/1992 | Martinez . |
| 5,147,036 | 9/1992 | Jacobs . |
| 5,154,284 | 10/1992 | Starkey ............................. 206/308.1 X |
| 5,170,889 | 12/1992 | Cue ............................. 206/232 |
| 5,193,681 | 3/1993 | Lievsay ............................. 206/308.3 |
| 5,207,717 | 5/1993 | Manning ............................. 206/308.3 X |
| 5,248,032 | 9/1993 | Sheu et al. . |
| 5,318,222 | 6/1994 | Bartlett . |
| 5,422,875 | 6/1995 | Bribach . |
| 5,460,265 | 10/1995 | Kiobasa . |
| 5,462,160 | 10/1995 | Youngs . |
| 5,472,083 | 12/1995 | Robinson et al. . |

Primary Examiner—Jacob K. Ackun
Attorney, Agent, or Firm—Lockwood, Alex, Fitzgibbon & Cummings

[57] ABSTRACT

A compact disc folder in the form of a booklet is disclosed which has a multi-page booklet portion held between two opposing panels of a cover portion. The front panel of the cover portion includes a pocket formed thereon in opposition to the booklet portion. The pocket includes two opposing flaps by which it is attached to the front panel and one of the flaps includes a notch that permits the flap to lie flat on the front panel without interfering with the booklet portion so that the folder will lie flat when closed.

18 Claims, 3 Drawing Sheets

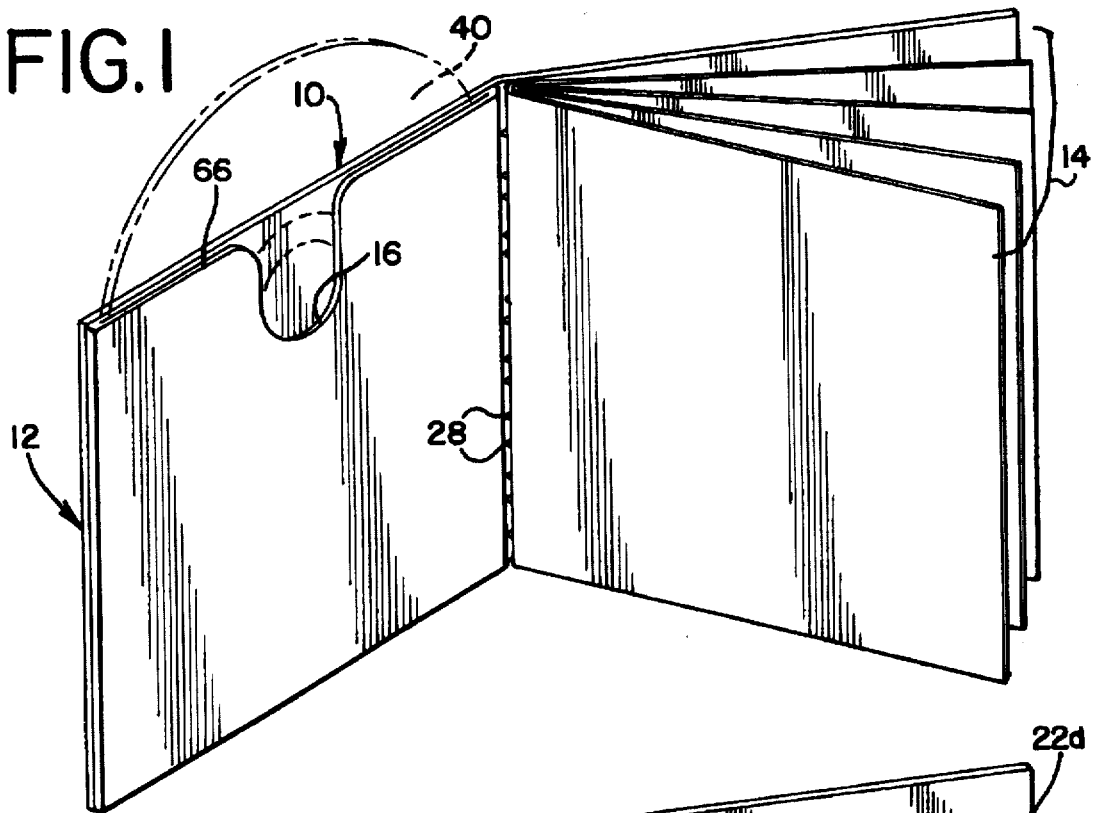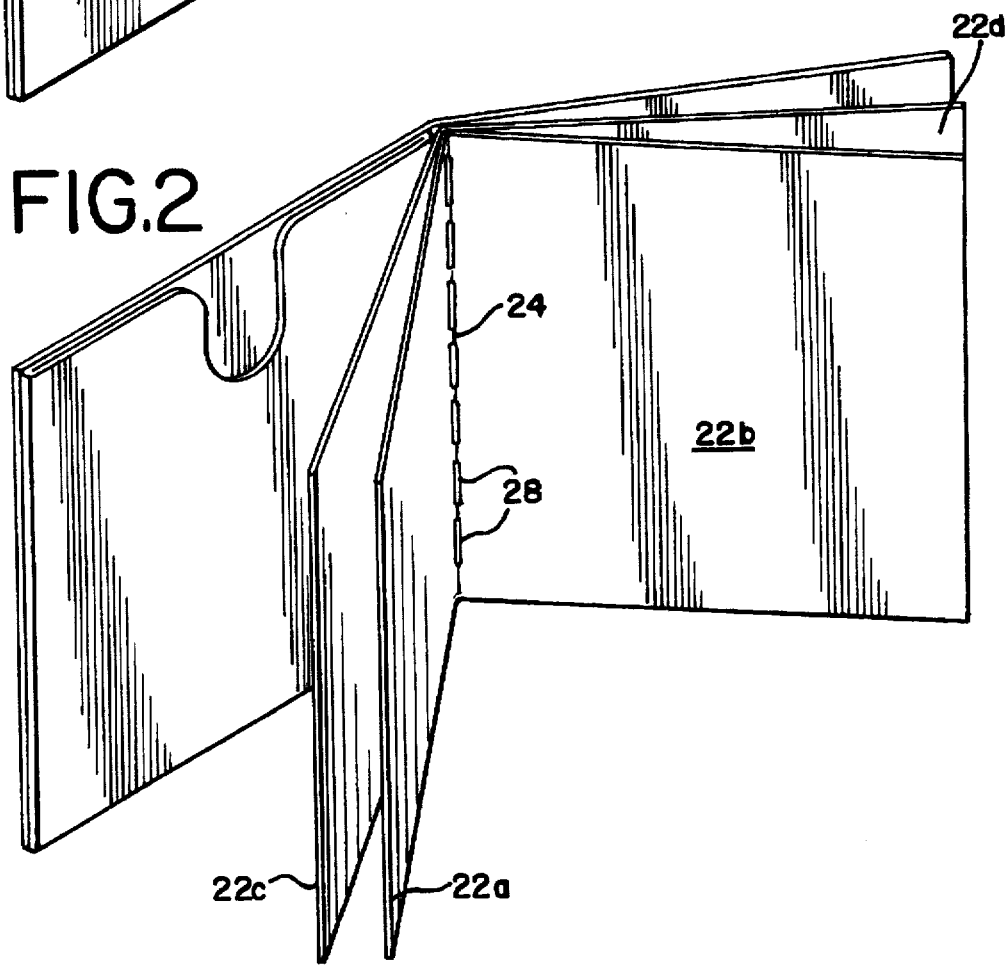

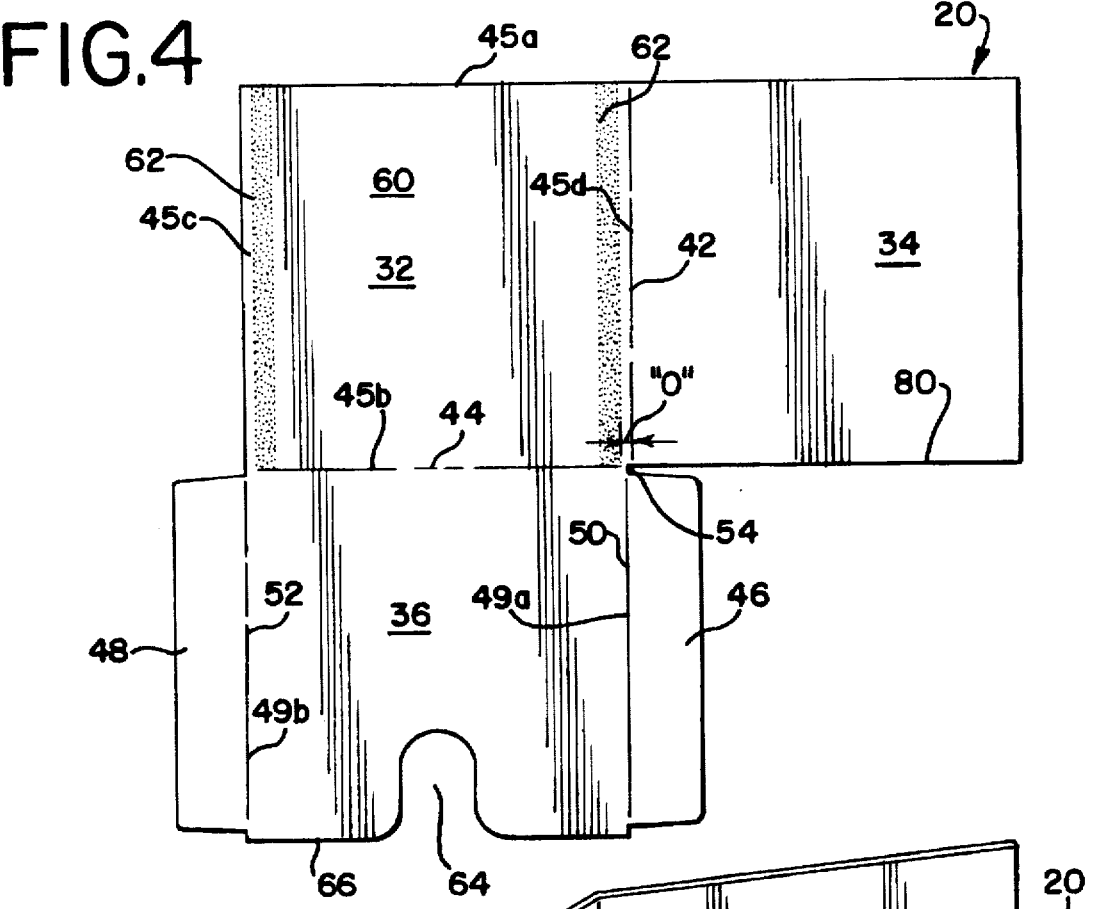
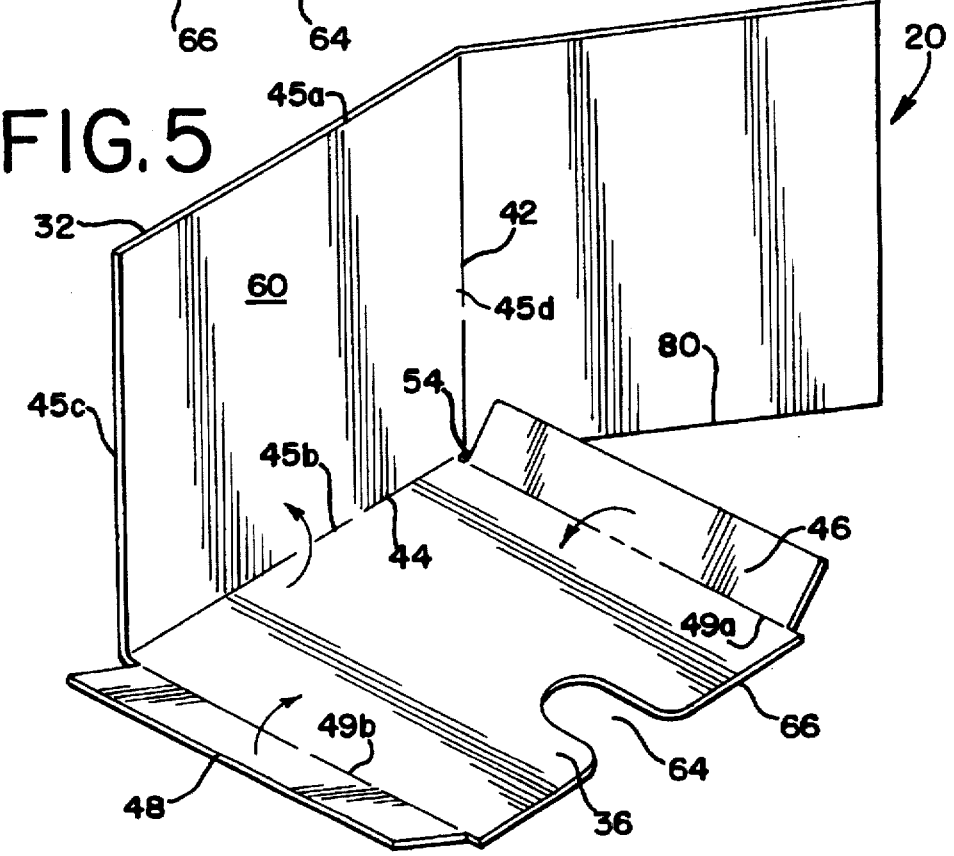

5,669,491

1

COMPACT DISC FOLDER BOOKLET

BACKGROUND OF THE INVENTION

The present invention relates generally to holders for compact discs and, more particularly, to compact discs holders having printed information that accompanies the compact disc.

Compact discs are used to store both digitally recorded music and computer programming information. The use of compact discs for computer programming has risen dramatically over the past few years and this use will likely increase because of the ability to store an enormous amount of data on a compact disc.

Audio compact discs, i.e., those containing prerecorded music, are typically stored in plastic containers known in the trade as "jewel boxes." Jewel boxes utilize front and rear plastic panels that are hinged together along adjacent edges. Although the jewel box is an effective storage device for compact discs, it is not recyclable and it is prone to breakage when sent through the mail.

Furthermore, jewel boxes are bulky compared to the thin compact disc stored therein. Manufacturing costs for the jewel box are also relatively high. The plastic jewel box is not easily printed on and any printed information accompanying the compact disc is enclosed in the box and positioned to show through the jewel box. As such, the manufacturing expense includes not only the plastic, molding and assembly costs for the jewel box but also the printing and paper costs for the inserts. The size of the jewel box limits the amount of printed matter that can accompany the compact disc. Small information booklet are either enclosed in the jewel box or held within a recess on the back of the jewel box. Removal of such booklets is awkward.

There have been attempts to provide compact disc holders that overcome the disadvantages of the jewel box. These holders are formed from paper, such as those disclosed in U.S. Pat. No. 5,085,318. Although compact, this compact disc holder provides little room for printed information and any such information must be printed on the front and back covers only. U.S. Pat. No. 5,154,284 discloses a compact disc holder that uses one large, single sheet of paper that is folded accordion-style in a map-like fashion for storage within the CD holder. Opening and refolding the printed material is awkward and the number of folds increases the cost of the holder.

The present invention is directed to a compact disc folder which overcomes the disadvantages of the aforementioned prior art.

Accordingly, it is a general object of the present invention to provide a compact disc folder in the form of a booklet having distinct cover and booklet portions and which holds a compact disc in an internal pocket as well as printed text or instructions.

Another object of the present invention is to provide a compact disc folder for holding a compact disc and providing a suitable amount of printed information with the compact disc.

Yet another object of the present invention is to provide a compact disc folder in the form of a booklet having a relatively rigid cover portion that encloses a disc-receiving pocket and a text portion having multiple pages, the pages being integrated into the booklet and attached to the cover portion thereof.

SUMMARY OF THE INVENTION

In one aspect, the present invention is directed to a compact disc folder having a cover portion made from a paperboard blank having distinct front and rear panels interconnected by a vertical foldline. A pocket is formed on an interior surface of the front panel and overlies, when the folder is closed, a multiple page booklet portion held between the front and rear panels. The pages of the booklet portion have centerlines that are aligned with the first foldline of the folder.

In another aspect of the present invention, the folder includes a pocket panel attached to the front panel along a second foldline arranged generally perpendicular to the first foldline. The pocket panel is attached to the front panel by way of attachment flaps which are glued to the front panel along opposing side edges so that the pocket panel overlies the front panel. The flaps are of a length less than a corresponding length of the front panel side edges they are attached to so that the pocket lies flat upon the front panel and doesn't bulge upwardly to cause interference with closing of the folder.

In still another aspect of the present invention, at least one of the flaps includes a notch formed between it and the front and rear panels of the cover portion. This notch permits the one flap to be folded upon the pocket panel along a line that is offset from the first foldline of the cover portion, thereby also ensuring that the folder as a whole will lie flat when in a closed position and also ensuring that the pocket does not interfere with the attachment of the booklet pages to the cover portion.

These and other objects, features and advantages of the present invention will be clearly understood through consideration of the following detailed description.

BRIEF DESCRIPTION OF THE DRAWINGS

In the course of the following detailed description, reference will be frequently made to the accompanying drawings in which:

FIG. 1 is a perspective view of one embodiment of a compact disc folder constructed in accordance with the principles of the present invention;

FIG. 2 is the same view as FIG. 1, but showing the booklet portion thereof in an open position;

FIG. 4 is a plan view of a blank used in constructing the cover portion of the compact disc folder of FIG. 1; and, FIG. 5 is a perspective view of the blank of FIG. 4 in a partially-folded condition, illustrating the initial steps in constructing the cover portion thereof.

DETAILED DESCRIPTION OF THE INVENTION

Figure 3:
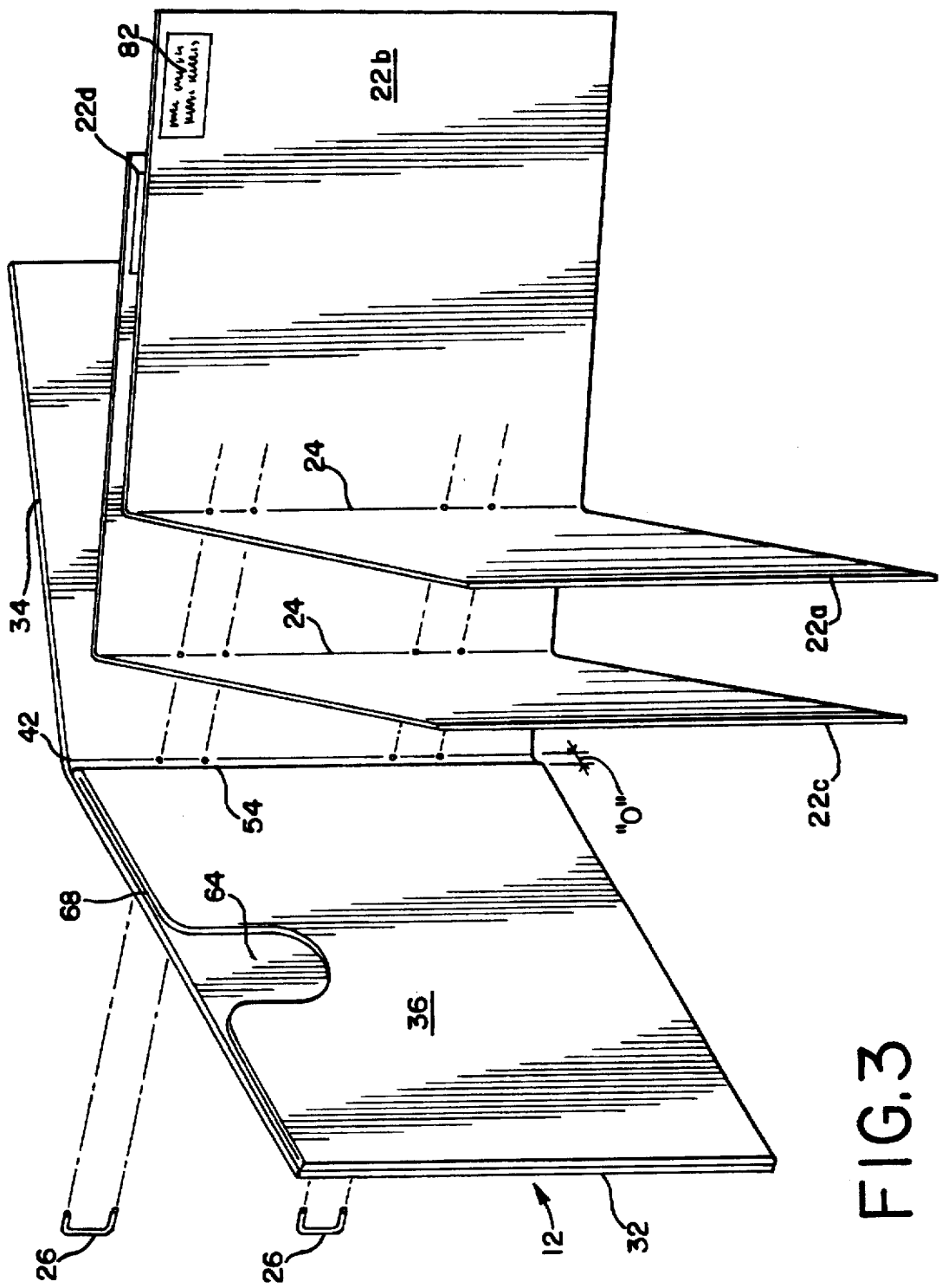
FIG. 3 is an exploded view of the compact disc folder of FIG. 1.

Referring to FIG. 1, a compact disc folder constructed in accordance with the principles of the present invention is illustrated generally at 10. The folder 10 takes the form of a booklet and includes an outer cover portion 12, an internal multiple page portion 14 and a compact disc-receiving pocket 16. The cover portion 12 may be easily formed from a single blank 20 of paperboard or another relatively rigid material. (FIG. 4.)

The page portion 14 of the folder 10 includes multiple pages 22a, 22b, 22c & 22d that are folded around a central, common foldline 24 thereof. The page portion 14 preferably includes multiple pages in groups of two pages, such as 22a & 22b and 22c & 22d. Any number of pages may be used in constructing the page portion 14. The page portion 14 may be attached to the cover portion 12 of the folder by any suitable means, such as by staples 26, as illustrated in FIG. 3, or by stitching 28, as illustrated in FIGS. 1 & 2.

Turning now to the specific details of the cover portion 12, and with particular reference to FIGS. 4 & 5, it can be seen that the cover portion 12 is formed from a single blank 20. The cover portion 12 includes a front panel 32 defined thereon which serves as the cover of the folder 10, a rear panel 34 defined thereon which serves as the back of the folder 10 and an interior pocket panel 36 defined thereon which serves to form the disc-receiving pocket 16 that holds the compact disc 40, shown in phantom, therein.

The front panel 32 and the rear panel 34 are interconnected to each other along common opposing edges that meet at an intervening foldline 42 which has a vertical orientation when the folder 10 is in an upright position such as illustrated in FIGS. 1–3. The interior panel 36 is interconnected to the front panel 32 along common opposing edges that meet at an intervening second foldline 44 that assumes a horizontal orientation when the folder 10 is in its upright position. The second foldline 44, as indicated in the Figures, is angularly offset from the foldline 42 and is preferably generally perpendicular thereto. The front panel 32 has two pairs of side edges 45a–45d that define its dimensions and extent. Two of these side edges 45a, 45b are located along the top and bottom edges of the front panel 32, while the remaining two side edges 45c, 45d define the sides of the front panel 32 and interconnect the top and bottom side edges 45a, 45b together.

The interior panel 36 that forms the pocket 16 in cooperation with the front panel 32 of the folder 10 includes two attachment panels, or flaps 46, 48 that are interconnected to the interior panel 36 along two opposing side edges 49a, 49b thereof. The flaps 46, 48 are separated from the interior panel 36 by intervening third and fourth foldlines 50, 52 that extend generally parallel to the foldline 42.

In an important aspect of the present invention, the third foldline 50 is slightly offset from the foldline 42 that separates the front and rear panels 32, 34. This offset is indicated at "O" in FIG. 4. The third foldline 50 defines the right side edge 54 of the interior panel 36 and of the disc-receiving pocket 16. The offset keeps the right side edge 54 of the pocket away from the center of the folder 10 and away from the foldline 42 to permit alignment of the page centerlines 24 with the foldline 42. This offset also permits the folder to lay substantially flat when in a closed, folded position, wherein the front panel is folded upon the rear panel 34 with the pages 22a–22d held therebetween.

In order to facilitate assembly of the pocket 16, at least one flap 50, and preferably both flaps 50, 52 have lengths that are less than the lengths of the side edges 49a, 49b of the interior panel 36. This dimensional relationship is preferably accomplished for the one flap 50 by way of a notch 54 interposed between the end 55 of the flap 50 and the bottom side edge 45b of the front panel 32 and the bottom side edge 80 of the rear panel 34. The notch 54 can be seen to terminate past the first foldline 42 and adjacent the front panel 32 along the bottom side edge 45b thereof. The notch further terminates at the third foldline 50 to ensure that the offset "O" is not compromised.

Adhesive is used to attach the flaps 50, 52 to the inner surface 60 of the front panel 36. The adhesive is preferably a permanent adhesive and is applied to either the front panel inner surface 60 in strips or beads 62, as illustrated, or it may be applied to the flaps 50, 52 themselves. The interior panel may further include a cutout 64 extending from one side edge 66 thereof which lies adjacent the opening 68 of the pocket 16. This cutout 64 extends inwardly a sufficient extent top permit a user to reliably grab hold of the compact disc 40 when it is retained within the pocket 16.

In assembling the folders 10 of the present invention, the blank 20 may be die cut from a sheet of paperboard, and the flaps 50, 52 folded about their respective foldlines 49a, 49b as illustrated in FIG. 5. The interior panel 36 is thereupon folded onto the front panel 32 around foldline 44. The page portions 14 are then attached to the cover portion 12 by saddle stitching, stapling or any other suitable means, such as gluing along the foldline 42. This construction permits the pages to be numbered with individual serial numbers in designated areas 20 for promotional and ordering purposes during the printing of the pages prior to assembly into the cover portion 12.

While the preferred embodiments of the invention have been shown and described, it will be apparent to those skilled in the art that changes and modifications may be made therein without departing from the spirit of the invention, the scope of which is defined by the appended claims.

What is claimed is:

1. A compact disc folder having a booklet shape, comprising: a cover portion and an internal booklet portion, the booklet portion having a plurality of pages and the cover portion enclosing the booklet pages, the cover portion including a front panel, a rear panel and an interior panel, the front and rear panels being interconnected together along by a first foldline and said front and interior panels being interconnected together along a second foldline, the first and second foldlines being arranged generally perpendicular to each other, said cover portion further including a pair of flaps formed on said interior panel and interconnected thereto by respective third and fourth foldlines disposed generally parallel to said first foldline and generally parallel to said second foldline, said flaps being interconnected to said front panel to define a pocket between said front and interior panels, the pocket being dimensioned to receive therein a compact disc, said booklet portion pages being attached to said cover portion along said first foldline.

2. The compact disc folder as defined in claim 1, wherein said booklet portion is connected to said cover portion by saddle-stitching.

3. The compact disc folder as defined in claim 1, wherein said interior panel flaps are interconnected to said front panel by an adhesive.

4. The compact disc folder as defined in claim 1, wherein said front panel has generally parallel, vertical left and right side edges and horizontal top and bottom side edges interconnecting said left and right side edges, said folder pocket being disposed on an interior surface of said front panel and said interior panel flaps being connected to said front panel interior surface generally along said front panel left and right side edges.

5. The compact disc folder as defined in claim 4, wherein said fourth foldline is adjacent said front panel left side edge and said third foldline is spaced apart from said first foldline, whereby, when said booklet is in a folded position and said front panel is folded onto said rear panel, a side edge of said pocket is spaced apart from said first foldline, allowing said booklet to lay substantially flat when folded.

6. The compact disc folder as defined in claim 1, wherein said interior panel has two spaced-apart, horizontal left and right side edges and one of said flaps has a length less than a length of said interior panel right side edge.

7. The compact disc folder as defined in claim 1, wherein said cover portion is formed from a single paperboard blank.

8. The compact disc folder as defined in claim 1, wherein said blank includes a notch formed between one of said interior panel flaps and said rear panel of said blank.

9. The compact disc folder as defined in claim 8, wherein said notch extends past said rear panel of said blank and adjacent said front panel of said blank.

10. The compact disc folder as defined in claim 1, wherein said front panel has generally parallel, vertical left and right side edges and horizontal top and bottom side edges interconnecting said left and right side edges, said folder pocket being disposed on an interior surface of said front panel and said interior panel flaps being connected to said front panel interior surface generally along said front panel left and right side edges, and said fourth foldline is adjacent said front panel left side edge and said third foldline is spaced apart from said first foldline, said folder further including a notch interposed between said interior panel flap and said front and rear panels, the notch terminating at said third foldline of said interior panel.

11. A compact disc folder for holding a compact disc and printed material accompanying the compact disc, a unitary cover portion, the cover portion having a front panel, a back panel and an interior panel formed together on a paperboard blank, the rear panel being interconnected to the front panel along common vertical side edges of said front and rear panels, said front and rear panels being separated by an intervening first foldline, the interior panel being interconnected to said front panel along common horizontal side edges said interior and front panels being separated by an intervening second foldline, said first and second foldlines being angularly offset from each other, said interior panel further including a pair of attachment flaps interconnected to said interior panel along a pair of opposing vertical side edges thereof, said attachment flaps being respectively separated from said interior panel by intervening third and fourth vertical foldlines, said attachment flaps being further folded upon said interior panel so that they face said front panel and adhesively attached thereto adjacent vertical side edges thereof to define an interior pocket of said folder, the pocket having an opening to permit a compact disc to be inserted into and removed from said pocket, said folder further including a booklet containing printed information, the booklet having multiple pages folded around a common centerline, said booklet being interconnected to said folder at said first foldline so that said booklet is retained between said front and rear panels of said folder.

12. The compact disc folder as defined in claim 11, wherein said unitary cover portion is formed from a paperboard blank.

13. The compact disc folder as defined in claim 11, wherein said booklet is interconnected to said cover portion by saddle-stitching.

14. The compact disc folder as defined in claim 11, wherein said booklet is interconnected to said cover portion by staples.

15. The compact disc folder as defined in claim 11, wherein said one of said attachment flaps is separated from said rear panel and partially separated from said front panel by a notch.

16. The compact disc folder as defined in claim 15, wherein said notch terminates generally adjacent said third foldline.

17. The compact disc folder as defined in claim 11, wherein said interior panel includes a cutout extending from said pocket opening into said interior panel, said cutout permitting a user to grasp a compact disc in said pocket for removal.

18. A compact disc booklet, comprising: a booklet cover portion and an internal text portion, the internal text portion having a plurality of pages and the booklet cover portion enclosing the pages, the booklet cover portion including a front panel, a rear panel and an interior panel, the front and rear panels being interconnected together along by a first foldline and said front and interior panels being interconnected together along a second foldline, the first and second foldlines being arranged generally perpendicular to each other having a pair of opposed sides and a pair of opposed ends, said booklet cover portion further including a pair of flaps formed on said interior panel and interconnected thereto by respective third and fourth foldlines disposed generally parallel to said first foldline and generally parallel to said second foldline, said flaps being interconnected to said front panel to define an internal pocket of said booklet disposed between said front and interior panels and adjacent said pages, the pocket being dimensioned to receive therein a compact disc, said pages being attached to said cover portion along said first foldline, said front panel having generally parallel, vertical left and right side edges and horizontal top and bottom side edges interconnecting said left and right side edges, said pocket being disposed on an interior surface of said front panel and said interior panel flaps being connected to said front panel interior surface generally along said front panel left and right side edges, and said fourth foldline is adjacent said front panel left side edge and said third foldline is spaced apart from said first foldline, said folder further including a notch interposed between said interior panel flap and said front and rear panels, the notch terminating at said third foldline of said interior panel.

* * * * *